DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 28, 1972

896 O.G. 1209

T896,053

RETOUCHING COLORED PHOTOGRAPHIC IMAGES

Charleton C. Bard and Joseph O. Kleffner, both of 1669 Lake Ave., Rochester, N.Y. 14650

Filed Feb. 12, 1971, Ser. No. 115,090

Int. Cl. G03c *7/00*

U.S. Cl. 96—56

No Drawing. 5 Pages Specification

Colored photographic images obtained in multilayer color films by means of color development are retouched to reduce the cyan dye density by treatment of the images composed of the cyan dye with an iodine-potassium iodide solution having a pH of about 5.5 to 6.5. The images are then treated with ammonium thiosulfate and washed.